US012803373B2

(12) United States Patent
Iwata et al.

(10) Patent No.: US 12,803,373 B2
(45) Date of Patent: Nov. 17, 2026

(54) ACTUATOR

(71) Applicant: SUMITOMO HEAVY INDUSTRIES, LTD., Tokyo (JP)

(72) Inventors: Masato Iwata, Kanagawa (JP); Tomohiro Kaneishi, Kanagawa (JP); Koji Moritani, Kanagawa (JP); Yuta Matsumoto, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 218 days.

(21) Appl. No.: 18/632,490

(22) Filed: Apr. 11, 2024

(65) Prior Publication Data

US 2024/0348122 A1 Oct. 17, 2024

(30) Foreign Application Priority Data

Apr. 14, 2023 (JP) ................................ 2023-066533

(51) Int. Cl.
*H02K 7/00* (2006.01)
*H02K 3/46* (2006.01)
*H02K 7/08* (2006.01)
*H02K 11/21* (2016.01)

(52) U.S. Cl.
CPC ............... *H02K 7/003* (2013.01); *H02K 3/46* (2013.01); *H02K 7/085* (2013.01); *H02K 11/21* (2016.01)

(58) Field of Classification Search
CPC .......... H02K 7/003; H02K 3/46; H02K 7/085; H02K 11/21; H02K 3/50; H02K 7/116; H02K 11/30; H02K 2211/03; F16D 1/0847
USPC ...................................................... 310/12.32
See application file for complete search history.

(56) References Cited

U.S. PATENT DOCUMENTS

| | | | | |
|---|---|---|---|---|
| 10,742,087 | B2 | 8/2020 | Seshita et al. | |
| 2010/0170355 | A1* | 7/2010 | Kume | F16H 61/32 29/428 |
| 2013/0257230 | A1 | 10/2013 | Park et al. | |
| 2021/0404525 | A1* | 12/2021 | Fukasawa | F16D 65/123 |
| 2023/0265788 | A1* | 8/2023 | Yazaki | H02K 7/003 310/40 R |
| 2024/0146166 | A1* | 5/2024 | Druant | H02K 21/024 |

FOREIGN PATENT DOCUMENTS

| | | | |
|---|---|---|---|
| CN | 108183575 | A | 6/2018 |
| CN | 109361301 | A | 2/2019 |
| DE | 102015210641 | A1 | 12/2016 |
| JP | 2006-317009 | A | 11/2006 |
| WO | 2022031238 | A1 | 2/2022 |

OTHER PUBLICATIONS

European Search Report dated Sep. 9, 2024 for the corresponding European Patent Application No. 24169586.5.

* cited by examiner

*Primary Examiner* — Charles Reid, Jr.
(74) *Attorney, Agent, or Firm* — Michael Best & Friedrich LLP

(57) ABSTRACT

Provided is an actuator including a hollow portion penetrating the actuator in an axial direction, the actuator including: a first shaft that surrounds the hollow portion; and a second shaft that surrounds the hollow portion and is connected to the first shaft to be rotatable integrally therewith, in which the first shaft and the second shaft include a fitting portion in which the first shaft is fitted to an inner periphery of the second shaft, and are connected to each other in the fitting portion.

17 Claims, 5 Drawing Sheets

ACTUATOR

CROSS-REFERENCE TO RELATED APPLICATIONS

This application claims priority to Japanese Patent Application No. 2023-066533, filed on Apr. 14, 2023, which is incorporated by reference herein in its entirety.

BACKGROUND

Technical Field

Certain embodiments of the present disclosure relate to an actuator.

Description of Related Art

The related art discloses an actuator including a motor and a speed reducer. In the actuator, a motor shaft and an input shaft of the speed reducer are provided to be integrally rotatable, and hollow portions penetrating the motor shaft and the input shaft are provided. In the actuator, the motor shaft and the input shaft are integrally formed.

SUMMARY

According to an aspect of the present disclosure, there is provided an actuator including a hollow portion penetrating the actuator in an axial direction, the actuator including: a first shaft that surrounds the hollow portion; and a second shaft that surrounds the hollow portion and is connected to the first shaft to be rotatable integrally therewith, in which the first shaft and the second shaft include a fitting portion in which the first shaft is fitted to an inner periphery of the second shaft, and are connected to each other in the fitting portion.

DETAILED DESCRIPTION

In a case where the motor shaft and the input shaft described in the related art are separate bodies, the motor shaft and the input shaft are usually connected to each other by a flange connection. When a plurality of shafts are connected to each other by the flange connection as described above, it is difficult to increase inner diameters of hollow portions surrounded by the plurality of shafts while reducing outer diameters of the plurality of shafts. This is not a problem limited to a case where the motor shaft and the input shaft are to be connected to each other, and is a common problem in a case where a first shaft and a second shaft that are used in the actuator and that surround the hollow portions are to be connected to each other.

Therefore, it is desirable to provide an actuator capable of increasing inner diameters of hollow portions while reducing outer diameters of shafts that are connected to each other.

Hereinafter, embodiments for implementing an actuator of the present disclosure will be described. The same or equivalent elements are denoted by the same reference symbols, and duplicate descriptions will not be repeated. In each drawing, for convenience of description, components are appropriately omitted, enlarged, or reduced. The drawings shall be viewed in accordance with the orientation of the reference symbols.

One Embodiment

Figure 1:
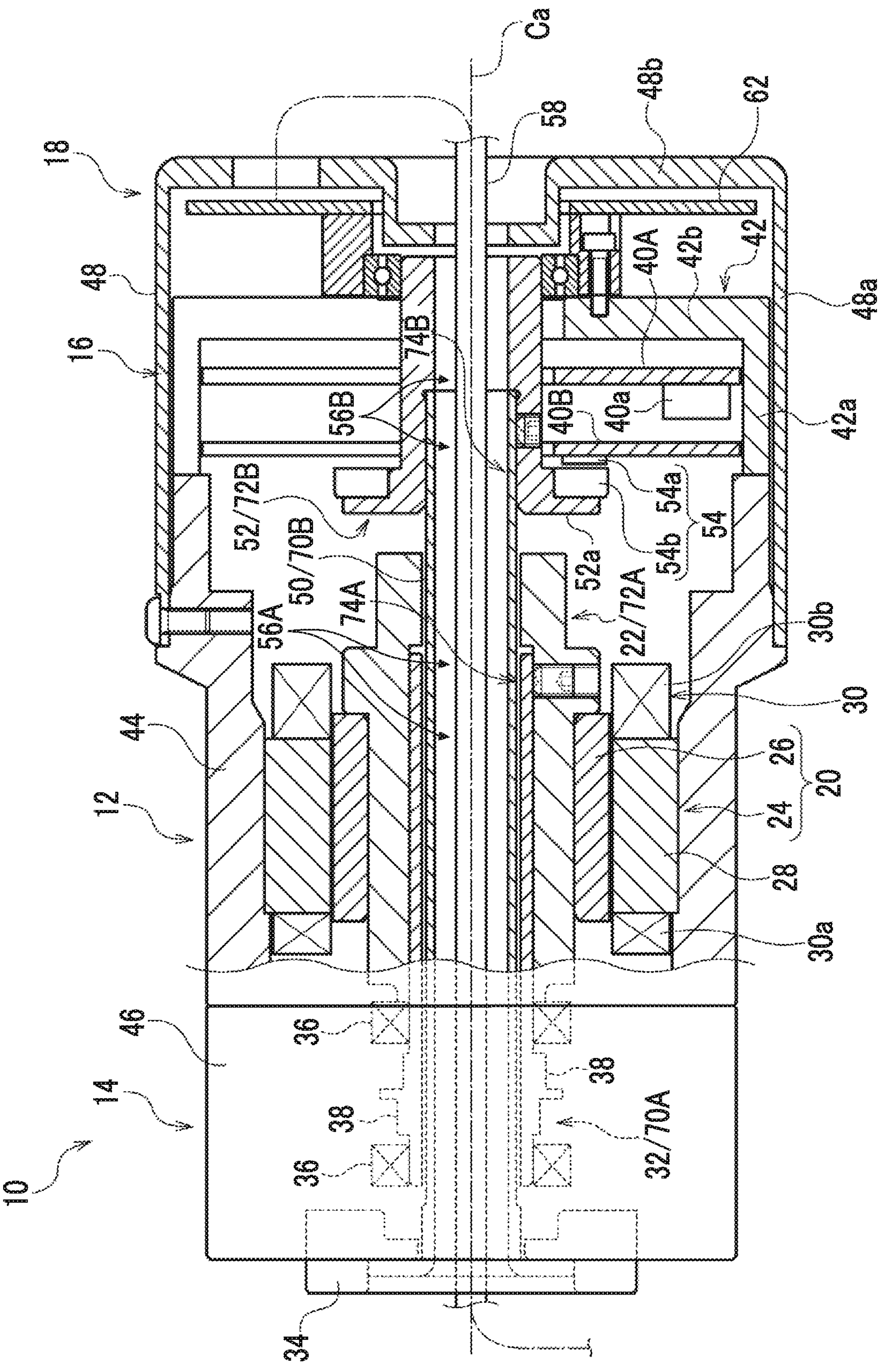
FIG. 1 is a partial cross-sectional side view showing an actuator according to one embodiment.

An actuator of one embodiment will be described. FIG. 1 will be referred to. An actuator 10 is used in, for example, various robots (industrial robots, service robots, and the like) such as an articulated robot, various industrial machines (machine tools, construction machines, and the like), various machines (conveyors, vehicles, and the like), and the like.

The actuator 10 includes a motor 12, a speed reducer 14 that reduces rotation output from the motor 12, a driver unit 16 that drives the motor 12, and a housing 18. The actuator 10 is not limited to such a configuration and can adopt various configurations. For example, the speed reducer 14 or the driver unit 16 may not be provided. In addition, as a driving device, a drive source (for example, an engine) different from the motor 12 may be provided.

The motor 12 includes a motor main body 20 and a motor shaft 22 that is rotationally driven by the motor main body 20. The motor shaft 22 is an example of a drive shaft that outputs rotational power. The motor main body 20 includes a stator 24 fixed to the housing 18 and a rotor 26 that generates a rotating magnetic field in cooperation with the stator 24. The stator 24 includes a stator main body 28 and a motor coil 30 wound around the stator main body 28. The stator main body 28 is configured using, for example, a stator core or the like. The motor coil 30 includes a load-side coil end portion 30*a* provided on a load side with respect to the stator main body 28, and a counter-load-side coil end portion 30*b* provided on a counter-load side with respect to the stator main body 28. Here, the load side refers to a side where the speed reducer 14 is located in an axial direction, and the counter-load side refers to a side opposite to the load side in the axial direction.

The speed reducer 14 includes an input shaft 32 to which rotation is input from the motor shaft 22, a reduction mechanism (not shown) that reduces the rotation input to the input shaft 32, and an output member 34 that outputs the rotation reduced by the reduction mechanism to the outside. The input shaft 32 is rotatably supported by an input shaft bearing 36 provided in the speed reducer 14. The output member 34 is rotatably supported by a bearing (not shown).

For example, the reduction mechanism transmits power by using a transmission element such as a gear or a traction drive. Here, an example is shown in which a center crank-type eccentric oscillating reduction mechanism is used as the reduction mechanism, and an eccentric body 38 for transmitting rotation to the eccentric oscillating reduction mechanism is provided in the input shaft 32. Since an operating principle of this type of speed reduction mechanism is known, a detailed description thereof will be omitted herein. A specific example of the reduction mechanism is not particularly limited, and in addition to a distribution type eccentric oscillating reduction mechanism, a simple planetary reduction mechanism, a bending meshing type reduction mechanism (silk hat type, cup type, tube type, or the like), an orthogonal shaft reduction mechanism, a parallel shaft reduction mechanism, or the like may be used.

The driver unit 16 includes at least one circuit board 40A and 40B and a driver casing 42 that accommodates the circuit boards 40A and 40B. The circuit boards 40A and 40B include a driver board 40A and a rotation detection board 40B. The driver board 40A is provided with a control unit 40*a* configured of a driver integrated circuit (IC) and the like. The control unit 40*a* generates drive power by using electric power supplied from a power supply device, and drives the motor main body 20 by using the drive power to control the motor main body 20.

The driver casing 42 includes a peripheral wall portion 42*a* that covers the circuit boards 40A and 40B from a radially outer side, and an end wall portion 42*b* that covers the circuit boards 40A and 40B from one side (counter-load side) in the axial direction. The circuit boards 40A and 40B are fixed to the driver casing 42 by using a screw (not shown) or the like. The driver casing 42 functions as a heat sink for receiving heat emitted from the circuit boards 40A and 40B by heat conduction and releasing the heat to the outside.

The housing 18 accommodates various internal components of the actuator 10. The housing 18 includes a motor housing 44 that configures a part of the motor 12, a speed reducer housing 46 that configures a part of the speed reducer 14, and a cover 48 that covers the driver unit 16. The motor housing 44 accommodates the motor main body 20 and the like. The speed reducer housing 46 accommodates the reduction mechanism, the output member 34, and the like. The cover 48 accommodates the driver unit 16 and the like. The cover 48 includes a tubular portion 48*a* that covers the driver unit 16 and an end plate portion 48*b* provided at an end portion of the tubular portion 48*a*. The respective components of the housing 18 are connected to each other by using a bolt, a screw structure, a rivet, or the like.

The actuator 10 is provided with, as optional configurations, a center pipe 50 that is rotatable integrally with the output member 34 of the speed reducer 14, an attachment shaft 52 connected to the center pipe 50, a rotation detector 54 for detecting rotation of the attachment shaft 52, and hollow portions 56A and 56B penetrating the actuator in the axial direction. The center pipe 50 penetrates the motor shaft 22 and the input shaft 32 in the axial direction.

The rotation detector 54 of the present embodiment is an encoder (an optical encoder, a magnetic encoder, or the like). A specific example of the rotation detector 54 is not particularly limited, and may be a resolver, a potentiometer, or the like. The rotation detector 54 includes a detection unit 54*a* provided in the rotation detection board 40B that is a part of the driver unit 16, and a detection target 54*b* provided at a position facing the detection unit 54*a*. The detection target 54*b* is attached to the attachment shaft 52 by adhesion, a screw, or the like. Here, an example is shown in which the detection target 54*b* is provided at a position facing the detection unit 54*a* in the axial direction, but the detection target 54*b* may be provided at a position facing the detection unit 54*a* in the radial direction. The detection target 54*b* is attached to a flange portion 52*a* provided on an outer peripheral portion of the attachment shaft 52.

For example, the detection unit 54*a* is an encoder integrated circuit (IC) that incorporates a sensor or the like, and the detection target 54*b* is a scale such as an optical scale or a magnetic scale. When the detection target 54*b* is rotated together with the attachment shaft 52, the detection unit 54*a* of this example detects a change in a predetermined physical quantity (magnetic field, light quantity, or the like) caused by rotation of the detection target 54*b* by a sensor, and processes a detection signal obtained thereby to detect rotation of the attachment shaft 52. In this way, the detection unit 54*a* detects the rotation of the attachment shaft 52 by using the detection target 54*b* that rotates together with the attachment shaft 52.

The hollow portions 56A and 56B of the present embodiment include a first hollow portion 56A penetrating the motor shaft 22 and the input shaft 32 in the axial direction, and a second hollow portion 56B penetrating the center pipe 50 and the attachment shaft 52 in the axial direction.

The hollow portions 56A and 56B are used to insert at least one external wiring 58 located outside the actuator 10. The external wiring 58 is used to connect the actuator 10 to an external device located outside the actuator 10. The external device here is, for example, a power supply device, an information processing device (a host control device or the like), another actuator, or the like. The external wiring configures, for example, a power line, a communication line, or the like. For example, the external wiring 58 is connected to a circuit board 62 mounted on the actuator 10 by using various connection means such as a terminal (a crimp terminal, a pressure contact terminal, a tab terminal, or the like), a connector, and solder. The circuit board 62 is connected to the driver board 40A by using a wiring (not shown).

Figure 2:
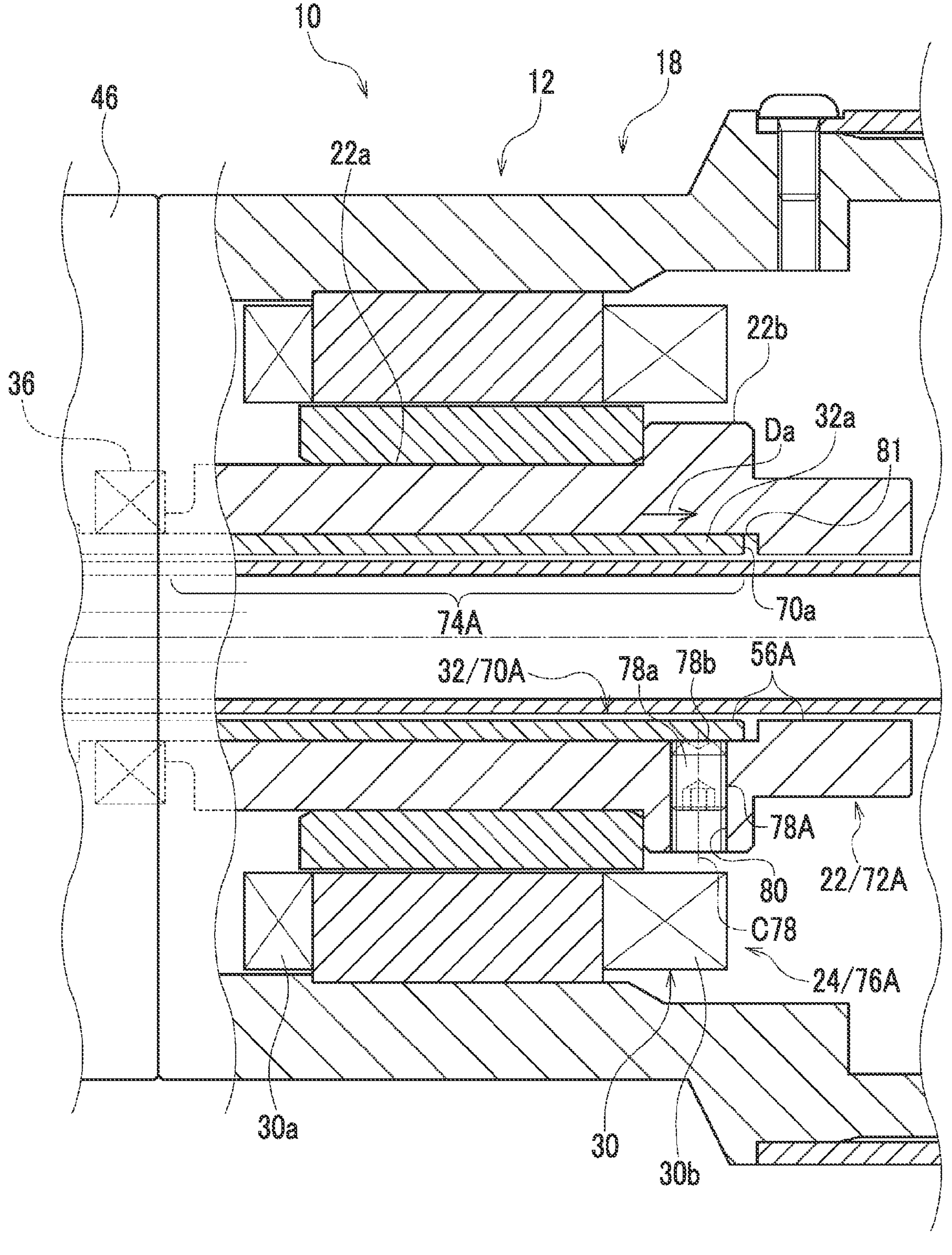
FIG. 2 is an enlarged view around a motor shaft of FIG. 1.
Figure 3:
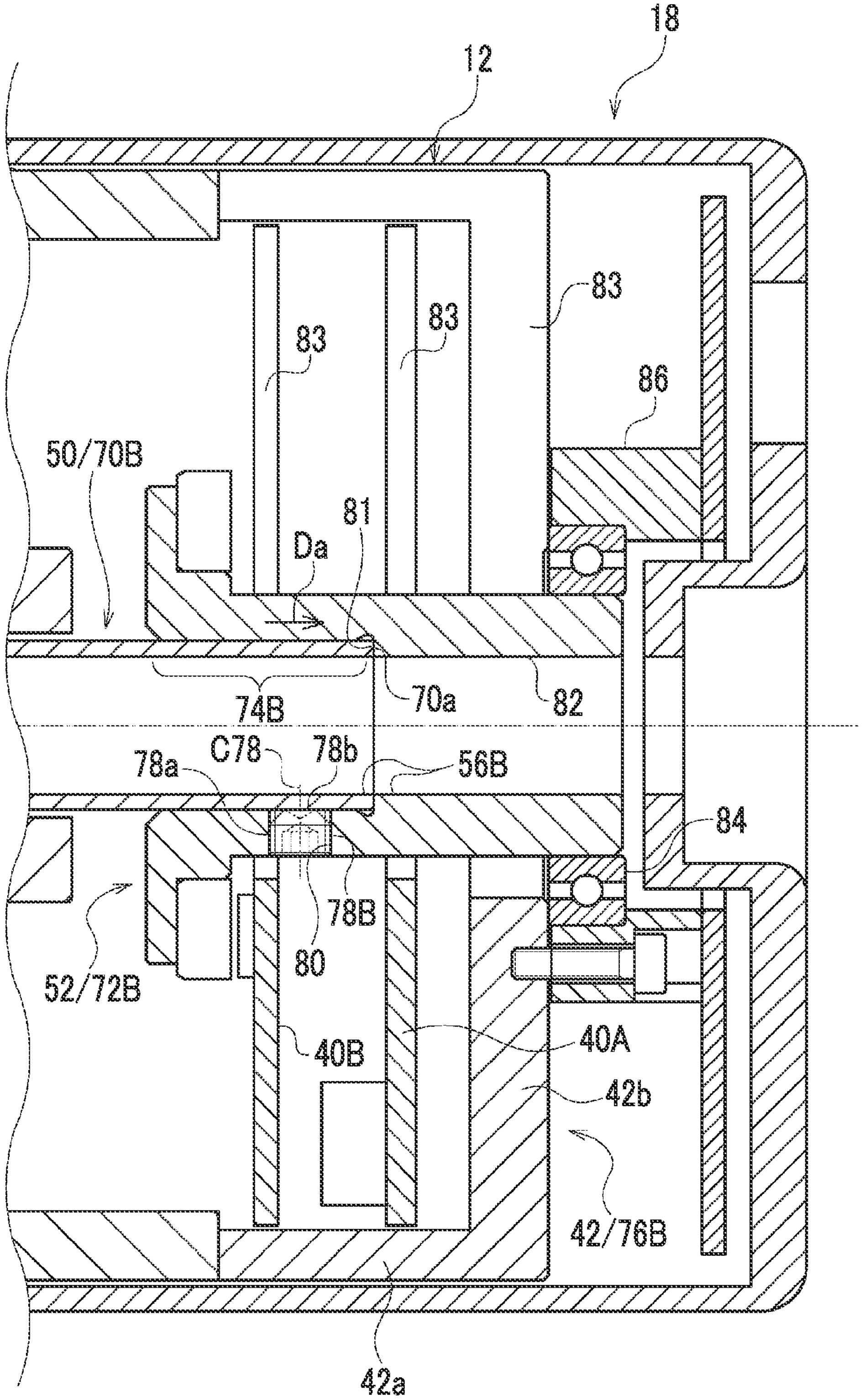
FIG. 3 is an enlarged view around an attachment shaft of FIG. 1.

FIGS. 2 and 3 will be referred to. The actuator 10 includes first shafts 70A and 70B, and second shafts 72A and 72B that are connected to the first shafts 70A and 70B to be rotatable integrally with the first shafts 70A and 70B. The first shafts 70A and 70B are disposed inside the second shafts 72A and 72B in at least a part of axial ranges of the first shafts 70A and 70B and the second shafts 72A and 72B. Hereinafter, in order to distinguish the first shafts 70A and 70B and the second shafts 72A and 72B from each other, the first shafts 70A and 70B located inside are referred to as inner shafts, and the second shafts 72A and 72B located outside are referred to as outer shafts. In the present specification, a direction along a rotation center line Ca of each shaft will be simply referred to as an axial direction, and a radial direction and a circumferential direction with the rotation center line Ca as a center of a circle will be simply referred to as a radial direction and a circumferential direction.

The actuator 10 includes a first inner shaft 70A and a first outer shaft 72A which are connected to each other, and a second inner shaft 70B and a second outer shaft 72B which are connected to each other. In the present embodiment, the first inner shaft 70A is the input shaft 32, and the first outer shaft 72A is the motor shaft 22. In addition, in the present embodiment, the second inner shaft 70B is the center pipe 50, and the second outer shaft 72B is the attachment shaft 52.

The inner shafts 70A and 70B and the outer shafts 72A and 72B that are connected to each other surround the hollow portions 56A and 56B. This means that parts of the hollow portions 56A and 56B are formed inside the shafts referred to. The first inner shaft 70A (input shaft 32) and the first outer shaft 72A (motor shaft 22) surround the first hollow portion 56A by forming the first hollow portion 56A inside these shafts. The second inner shaft 70B (center pipe 50) and the second outer shaft 72B (attachment shaft 52) surround the second hollow portion 56B by forming the second hollow portion 56B inside these shafts. The second inner shaft 70B and the second outer shaft 72B are inserted into the first hollow portion 56A of the first inner shaft 70A and the first outer shaft 72A.

The inner shafts 70A and 70B and the outer shafts 72A and 72B include fitting portions 74A and 74B in which the inner shafts 70A and 70B are fitted to inner peripheries of the outer shafts 72A and 72B. The fitting portions 74A and 74B include a first fitting portion 74A in which the first inner shaft 70A is fitted to the inner periphery of the first outer shaft 72A, and a second fitting portion 74B in which the second inner shaft 70B is fitted to the inner periphery of the second outer shaft 72B.

The actuator 10 includes outer members 76A and 76B that are located away from the outer shafts 72A and 72B on the radially outer side. The outer members 76A and 76B include a first outer member 76A corresponding to the first outer shaft 72A and a second outer member 76B corresponding to the second outer shaft 72B. In the present embodiment, the first outer member 76A is the stator 24, and the second outer member 76B is the driver casing 42. The outer members 76A and 76B surround the outer shafts 72A and 72B corresponding thereto inside the housing 18. In order to satisfy such a condition of surrounding, cutout portions 83 (to be described later) may be formed in parts of the outer members 76A and 76B in the circumferential direction.

The actuator 10 includes fastening members 78A and 78B that fasten the inner shafts 70A and 70B and the outer shafts 72A and 72B in the radial direction. The fastening members 78A and 78B of the present embodiment include a first fastening member 78A that fastens the first inner shaft 70A and the first outer shaft 72A, and a second fastening member 78B that fastens the second inner shaft 70B and the second outer shaft 72B. Here, "fastening in the radial direction" means fastening two elements referred to by using the fastening members 78A and 78B including shaft portions 78*a* extending along the radial direction. Here, set screws (headless set screws) will be described as examples of the fastening members 78A and 78B. However, the present disclosure is not limited thereto, and various screws, bolts, rivets, or the like may be adopted.

The fastening members 78A and 78B serving as set screws include a shaft portion 78*a* extending along the radial direction and including a male screw formed thereon, and a head portion is not provided at a base end portion thereof. A tool hole for inserting a tool for rotating the fastening members 78A and 78B is provided in the base end portion of the shaft portion 78*a*. The fastening members 78A and 78B are screwed into insertion holes 80 provided in the outer shafts 72A and 72B, and thus fasten the inner shafts 70A and 70B and the outer shafts 72A and 72B in the radial direction. In order to realize this, the fastening members 78A and 78B are provided with a pressing surface 78*b* such as a recessed tip at a tip of the shaft portion 78*a*, and the pressing surface 78*b* is pressed against the inner shafts 70A and 70B, so that the inner shafts 70A and 70B and the outer shafts 72A and 72B are fastened in the radial direction. In addition, the fastening members 78A and 78B may be inserted into holes provided in the inner shafts 70A and 70B on a radially inner side, so that the inner shafts 70A and 70B and the outer shafts 72A and 72B are fastened in the radial direction. The fastening members 78A and 78B are provided to fit into the insertion holes 80 of the outer shafts 72A and 72B. Here, only one set of fastening members 78A and 78B is shown for each fastening target. However, a plurality of sets of fastening members 78A and 78B may be used for each fastening target.

The inner shafts 70A and 70B and the outer shafts 72A and 72B are connected to each other in the fitting portions 74A and 74B. In order to realize this, the inner shafts 70A and 70B and the outer shafts 72A and 72B of the present embodiment are connected to each other by being radially fastened by the fastening members 78A and 78B in the fitting portions 74A and 74B. The first inner shaft 70A and the first outer shaft 72A are connected to each other by being radially fastened by the first fastening member 78A in the first fitting portion 74A. The second inner shaft 70B and the second outer shaft 72B are connected to each other by being radially fastened by the second fastening member 78B in the second fitting portion 74B.

The effects of the above-described actuator 10 will be described. For example, in a case where the inner shafts 70A and 70B and the outer shafts 72A and 72B are connected to each other by the flange connection, it is necessary to provide a flange portion on the outer peripheral portion of each of both shafts and then to fasten both shafts in the axial direction by a fastening member.

In this regard, the inner shafts 70A and 70B and the outer shafts 72A and 72B of the present embodiment are connected to each other in the fitting portions 74A and 74B. Therefore, when connecting the inner shafts 70A and 70B and the outer shafts 72A and 72B, it is not necessary to provide the flange portions on the outer peripheral portions of both shafts. Therefore, it is advantageous in reducing outer diameters of both shafts as compared to a case where both shafts are connected using flanges. In addition, since the flange portions are not provided on the outer peripheral portions of both shafts, it is not necessary to reduce inner diameters of the hollow portions 56A and 56B surrounded by both shafts in order to reduce the outer diameters of both shafts. Therefore, it is advantageous in increasing the inner diameters of the hollow portions 56A and 56B as compared to a case where both shafts are connected using flanges. As a result, it is possible to increase the inner diameters of the hollow portions 56A and 56B that are surrounded by the first shafts 70A and 70B and the second shafts 72A and 72B that are connected to each other while reducing the outer diameters of the first shafts 70A and 70B and the second shafts 72A and 72B.

This means that, with regard to the first inner shaft 70A and the second inner shaft 70B that are connected to each other, it is possible to increase the inner diameter of the first hollow portion 56A surrounded by the first inner shaft 70A and the second inner shaft 70B while reducing the outer diameters of the first inner shaft 70A and the second inner shaft 70B. In addition, this means that, with regard to the second inner shaft 70B and the second outer shaft 72B that are connected to each other, it is possible to increase the inner diameter of the second hollow portion 56B surrounded by the second inner shaft 70B and the second outer shaft 72B while reducing the outer diameters of the second inner shaft 70B and the second outer shaft 72B. It is advantageous in that the external wiring 58 can be easily inserted into the hollow portions 56A and 56B by increasing the inner diameters of the hollow portions 56A and 56B. In addition, in connecting the inner shafts 70A and 70B and the outer shafts 72A and 72B to each other, a coupling for connecting both shafts is not required, and accordingly, it is advantageous in reducing an axial dimension of the actuator 10.

In relation to such an effect, the inner shafts 70A and 70B and the outer shafts 72A and 72B may be connected to each other by using connection elements other than the fastening members 78A and 78B in the fitting portions 74A and 74B thereof. The connection element here refers to, for example, an adhesive that bonds surfaces of the inner shafts 70A and 70B and the outer shafts 72A and 72B, which face each other in the radial direction, in the fitting portions 74A and 74B thereof.

Next, other features of the actuator 10 of the embodiment will be described. The fastening members 78A and 78B are disposed at positions overlapping the outer members 76A and 76B in the radial direction. The first fastening member 78A is disposed at a position overlapping the stator 24 serving as the first outer member 76A in the radial direction. The second fastening member 78B is disposed at a position overlapping the driver casing 42 serving as the second outer member 76B in the radial direction. In order to satisfy this condition, it is sufficient that a center line C78 passing through the shaft portions 78*a* of the fastening members 78A and 78B is disposed at a position overlapping the outer members 76A and 76B in the radial direction.

For example, a case will be considered where the fastening members 78A and 78B are disposed at positions that do not overlap the outer members 76A and 76B in the radial direction. In this case, while keeping axial dimensions of the outer members 76A and 76B unchanged, it is necessary to secure a space for the fastening members 78A and 78B in the outer shafts 72A and 72B at positions that do not overlap the outer members 76A and 76B in the radial direction, and it becomes necessary to make axial dimensions of the outer shafts 72A and 72B longer than necessary. The space for the fastening members 78A and 78B here refers to, for example, a space for the insertion hole 80 through which the fastening members 78A and 78B are inserted.

In this regard, according to the present embodiment, the fastening members 78A and 78B are disposed at positions overlapping the outer members 76A and 76B in the housing 18 in the radial direction. Therefore, as compared to a case where the fastening members 78A and 78B are disposed at positions that do not overlap the outer members 76A and 76B in the radial direction, the space for the fastening members 78A and 78B does not need to be secured in the outer shafts 72A and 72B at positions that do not overlap the outer members 76A and 76B in the radial direction. As a result, it is advantageous in reducing the axial dimension of the actuator 10.

FIG. 2 will be referred to. The input shaft 32 includes a counter-load-side extension portion 32*a* that extends to the counter-load side with respect to the rotor 26. The input shaft 32 extends to the counter-load side from a support location by the input shaft bearing 36 in the speed reducer housing 46 to a location where the counter-load-side extension portion 32*a* is located. The motor shaft 22 includes a rotor disposition section 22*a* in which the rotor 26 is disposed, and a large outer diameter portion 22*b* provided on the counter-load side with respect to the rotor disposition section 22*a* and having a larger outer diameter than the rotor disposition section 22*a*. The large outer diameter portion 22*b* of the motor shaft 22 can position the rotor 26 in the axial direction by coming into contact with the rotor 26.

The input shaft 32 and the motor shaft 22 are connected to each other at a position overlapping the counter-load-side coil end portion 30*b* of the motor coil 30 in the radial direction. This means that at least a part of a connection element (a fastening member, an adhesive, or the like) required for the connection of the shafts is located at a position overlapping the counter-load-side coil end portion 30*b* in the radial direction. In order to realize this, the first fastening member 78A that connects the shafts is disposed at a position overlapping the counter-load-side coil end portion 30*b* of the motor coil 30 in the radial direction. The first fastening member 78A of the present embodiment satisfies this condition at least in the center line C78 passing through the shaft portion 78*a* thereof. In addition, the entire first fastening member 78A (entire axial range) may satisfy this condition. The first fastening member 78A connects the counter-load-side extension portion 32*a* of the input shaft 32 and the motor shaft 22 to each other. In order to satisfy this condition, the shaft portion 78*a* of the first fastening member 78A is pressed against the counter-load-side extension portion 32*a* of the input shaft 32, but the shaft portion 78*a* of the first fastening member 78A may be inserted into a hole provided in the counter-load-side extension portion 32*a*. In addition, the first fastening member 78A of the present embodiment connects the large outer diameter portion 22*b* of the motor shaft 22 and the input shaft 32. In order to realize this, an insertion hole 80 for inserting the first fastening member 78A is formed in the large outer diameter portion 22*b* of the motor shaft 22.

For example, a case will be considered where the input shaft 32 and the motor shaft 22 are connected to each other at a position that does not overlap the stator 24 in the radial direction. In this case, while keeping an axial dimension of the stator 24, it is necessary to secure a space for the connection element required for connecting the shafts in each shaft only at a position that does not overlap the stator 24 in the radial direction, and it is necessary to make axial dimensions of both shafts longer than necessary. The space for the connection element here is, for example, a space for the fastening members 78A and 78B, an adhesive, or the like.

Here, in the motor shaft 22, a position overlapping the counter-load-side coil end portion 30*b* of the motor coil 30 on the radially inner side is usually a dead space. In particular, as compared to a position overlapping the load-side coil end portion 30*a* of the motor coil 30 on the radially inner side, a position overlapping the counter-load-side coil end portion 30*b* in the radial direction often includes a dead space having a wide axial dimension. The input shaft 32 and the motor shaft 22 of the present embodiment are connected to each other at a position where such a dead space having a wide axial dimension is formed. Therefore, a space for the connection element can be secured by using such a dead space. Therefore, as compared to a case where the input shaft 32 and the motor shaft 22 are connected to each other only at a position that does not overlap the stator 24 in the radial direction, it is not necessary to make axial dimensions of the input shaft 32 and the motor shaft 22 longer than necessary in order to secure a space for the connection element. As a result, it is advantageous in reducing the axial dimension of the actuator 10.

FIG. 3 will be referred to. The second inner shaft 70B is inserted into the second outer shaft 72B in an insertion direction Da toward one side (here, counter-load side) in the axial direction. The second outer shaft 72B includes an inner step portion 81 provided on an inner peripheral portion thereof and a small inner diameter portion 82 provided on the inner step portion 81 in the insertion direction Da with respect to the second fitting portion 74B. The inner step portion 81 is formed such that the inner diameter of the second outer shaft 72B decreases toward the insertion direction Da. The small inner diameter portion 82 has a smaller inner diameter than a location where the second fitting portion 74B is formed in the second outer shaft 72B. The small inner diameter portion 82 has a size equal to an inner diameter of an end portion of the second inner shaft 70B on the insertion direction Da side. Here, the concept of "equal" includes the same or substantially the same.

The second outer shaft 72B is positioned in the axial direction with respect to the second inner shaft 70B by the inner step portion 81 coming into contact with an axial end surface 70*a* of the second inner shaft 70B. The axial end surface 70*a* here refers to an end surface located on the most end side (insertion direction Da side) in the axial direction of the second inner shaft 70B. When the second outer shaft 72B is positioned with respect to the second inner shaft 70B, the second outer shaft 72B is not in contact with the second inner shaft 70B in a counter-insertion direction (axially opposite side of the insertion direction Da) with respect to the axial end surface 70*a* of the second inner shaft 70B. It can also be said that in the second inner shaft 70B, an outer step portion for positioning the second outer shaft 72B in the axial direction is not provided on the outer peripheral portion of the second inner shaft 70B in the counter-insertion direction with respect to the axial end surface 70*a* of the second inner shaft 70B.

Accordingly, when positioning the second outer shaft in the axial direction, since it is not necessary to provide the outer step portion for positioning the second outer shaft 72B on the outer peripheral portion of the second inner shaft 70B, it is advantageous in reducing the outer diameters of the second outer shaft 72B and the second inner shaft 70B. In addition, since the outer step portion for positioning does not need to be provided on the outer peripheral portion of the second inner shaft 70B, in reducing the outer diameters of the second outer shaft 72B and the second inner shaft 70B, it is not necessary to reduce the inner diameter of the second hollow portion 56B surrounded by both shafts. Therefore, it is advantageous in increasing the inner diameter of the second hollow portion 56B surrounded by the second inner shaft 70B and the second outer shaft 72B while reducing the outer diameters of the second inner shaft 70B and the second outer shaft 72B.

In addition, from the viewpoint of obtaining the same effect, the first outer shaft 72A may be positioned in the axial direction with respect to the first inner shaft 70A by providing the inner step portion 81 (refer to FIG. 2) on the inner peripheral portion of the first outer shaft 72A and causing the inner step portion 81 to come into contact with the axial end surface 70*a* of the first inner shaft 70A.

The second outer shaft 72B penetrates the driver unit 16 in the axial direction. The driver unit 16 surrounds the second outer shaft 72B. In order to satisfy this condition, for example, the driver unit 16 does not need to surround the entire periphery of the second outer shaft 72B, and the cutout portion 83 to be described below may be formed in a part of a circumferential range thereof to surround a range of at least half the circumferential range. The driver unit 16 is provided with the cutout portion 83 that is open toward the radially outer side from a location where the second outer shaft 72B is located. The cutout portion 83 of the present embodiment is formed in a circumferential range of a part of the peripheral wall portion 42*a* and the end wall portion 42*b* of the driver casing 42, and is also formed in a circumferential range of a part of the circuit boards 40A and 40B.

The second inner shaft 70B and the second outer shaft 72B are connected to each other at a position accessible from the outside through the cutout portion 83 of the driver unit 16. The term "accessible" herein means that a connection location of the second inner shaft 70B and the second outer shaft 72B (outer peripheral portion of the connection location of the second outer shaft 72B) is located at a position that can be reached when the hand is inserted from the radially outer side through the cutout portion 83. This means that, in a case where the second inner shaft 70B and the second outer shaft 72B are connected to each other by the second fastening member 78B as in the present embodiment, the second fastening member 78B is located at a position where the hand or a tool held by the hand reaches when the hand is inserted through the cutout portion 83. A circumferential position of the second fastening member 78B is changed by the rotation of the second outer shaft 72B. Therefore, when the second outer shaft 72B is at any position among relative positions with respect to the driver unit 16 that can be taken by the rotation of the second outer shaft 72B, the second fastening member 78B only needs to be located at a position where the hand or the like can reach through the cutout portion 83. In a case where the cover 48 that covers the driver unit 16 is present as in the present embodiment, it is sufficient that the access can be made through the cutout portion 83 when the cover 48 is removed. It can be said that the second inner shaft 70B and the second outer shaft 72B are connected to each other at a position overlapping the driver unit 16 in the radial direction.

For example, a case will be considered where the second inner shaft 70B and the second outer shaft 72B are connected to each other at a position that does not overlap the driver unit 16 in the radial direction. In this case, while keeping an axial dimension of the driver unit 16, it is necessary to secure a space for the connection element required for connecting the shafts in each shaft at a position that does not overlap the driver unit 16 in the radial direction, and it is necessary to make axial dimensions of both shafts longer than necessary. The space for the connection element here is, for example, a space for the fastening members 78A and 78B, an adhesive, or the like.

Here, in the second outer shaft 72B, a position overlapping the driver unit 16 on the radially inner side is usually a dead space. The second inner shaft 70B and the second outer shaft 72B of the present embodiment are connected to each other at a position accessible through the cutout portion 83 of the driver unit 16. That is, the shafts 70B and 72B are connected at a position overlapping the driver unit 16 in the radial direction as a location that becomes a dead space. Therefore, a space for the connection element can be secured by using such a dead space. Therefore, as compared to a case where the shafts are connected at a position that does not overlap the driver unit 16 in the radial direction, it is not necessary to make the axial dimensions of the shafts longer than necessary in order to secure a space for the connection element. As a result, it is advantageous in reducing the axial dimension of the actuator 10.

The second outer shaft 72B extends to the counter-load side with respect to the driver unit 16. The actuator 10 includes a bearing 84 that supports the second outer shaft 72B on the counter-load side with respect to the driver unit 16. The bearing 84 rotatably supports the second outer shaft 72B. The bearing 84 may be various sliding bearings in addition to various rolling bearings such as a ball bearing. Accordingly, an axial deflection of the second outer shaft 72B connected to the second inner shaft 70B can be restricted by the bearing 84, and the second inner shaft 70B and the second outer shaft 72B can be stably supported.

The actuator 10 includes a bearing support member 86 that supports the bearing 84. The bearing support member 86 is disposed on the counter-load side with respect to the driver unit 16. The bearing support member 86 is fixed to the driver casing 42 of the driver unit 16 by using a fixing tool such as a bolt. The bearing support member 86 of the present embodiment restricts axial movement of the bearing 84 by interposing the driver casing 42 between the driver unit 16 and the bearing support member 86.

Another Embodiment

Figure 4:
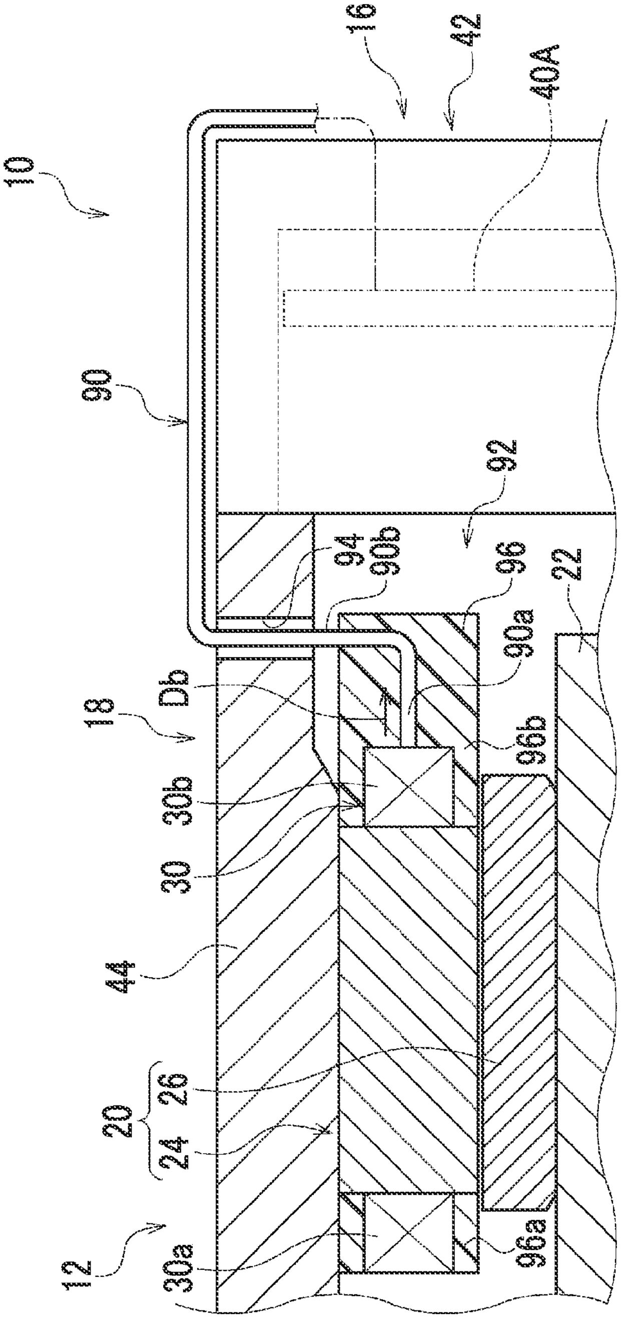
FIG. 4 is a side cross-sectional view showing a first mold member of another embodiment.

FIG. 4 will be referred to. An actuator 10 of another embodiment will be described. The content described in the actuator 10 of the subsequent embodiments may be used in combination with the content described in one embodiment. The housing 18 of the present embodiment includes the motor housing 44 and does not include the cover 48, unlike one embodiment.

The actuator 10 includes a wiring 90 drawn from the counter-load-side coil end portion 30*b* of the motor coil 30. A tip part of the wiring 90 is connected to a part (for example, the driver board 40A) of the driver unit 16. The wiring 90 includes a power line wiring that supplies power, which is supplied from the control unit of the driver board 40A, to the motor coil 30. The power line wiring may be, for example, three wirings corresponding to motor coils for three phases used for a three-phase motor, or may be a different number of wirings. In addition, the wiring 90 may include a communication line wiring for transmitting information between a sensor (a temperature sensor or the like) incorporated in the stator 24 and the driver board 40A. Here, only one wiring 90 is shown, but a plurality of wirings 90 may be present.

The housing 18 forms a counter-load-side space 92 on the counter-load side with respect to the motor coil 30 as a part of an internal space of the housing 18. The counter-load-side space 92 of the present embodiment is formed between the motor coil 30 and the driver unit 16. A movable component such as the motor shaft 22 is disposed in the counter-load-side space 92. The wiring 90 is drawn to the radially outer side via the counter-load-side space 92 of the housing 18 and then via a drawing hole 94 formed in the housing 18. Thereafter, the wiring 90 is provided to extend radially inward via a position overlapping the radially outer side on an outer peripheral side of the driver unit 16 and is connected to a part of the driver unit 16 at the tip part thereof. In addition, the wiring route of the wiring 90 is an example, and is not limited thereto.

The actuator 10 includes a first mold member 96 that covers the motor coil 30. The first mold member 96 is a mold resin formed of a resin material having insulation properties. The first mold member 96 includes a load-side mold portion 96*a* that covers the load-side coil end portion 30*a* of the motor coil 30 and a counter-load-side mold portion 96*b* that covers the counter-load-side coil end portion 30*b* of the motor coil 30. The first mold member 96 is formed by molding or the like and is integrated with the motor coil 30.

The first mold member 96 covers a base end portion 90*a* of the wiring 90 on the motor coil 30 side and fixes a drawing direction Db of the wiring 90 from the motor coil 30. The first mold member 96 usually covers the motor coil 30, but a covering range thereof is extended to the base end portion 90*a* of the wiring 90. Here, an example in which the drawing direction Db of the wiring 90 is the axial direction is shown. However, the drawing direction Db is not limited thereto, and may be, for example, the radial direction.

Accordingly, the first mold member 96 can restrain free movement of the wiring 90 at a location covered by the first mold member 96. Therefore, as compared to a case where the base end portion 90*a* of the wiring 90 is not covered by the first mold member 96, it is advantageous in avoiding interference between a movable component such as the motor shaft 22 and the wiring 90 due to large movement of the wiring 90 in the counter-load-side space 92 of the housing 18.

The wiring 90 includes a radially extending portion 90*b* extending radially outward toward a tip end side thereof in the counter-load-side space 92. The radially extending portion 90*b* is drawn from the counter-load-side space 92 via the drawing hole 94 of the housing 18. The radially extending portion 90*b* of the present embodiment is drawn radially outward from the first mold member 96. In order to realize this, a base end-side portion of the radially extending portion 90*b* of the wiring 90 is covered with the first mold member 96.

Accordingly, as compared to a case where the wiring 90 is drawn from the first mold member 96 along the axial direction, it is not necessary to form a bent portion having a large radius of curvature on the base end side of the radially extending portion 90*b* in providing the radially extending portion 90*b* in the wiring 90. As a result, an axial space required for the wiring 90 can be reduced in the counter-load-side space 92, and accordingly, it is advantageous in reducing the axial dimension of the actuator 10.

Further Embodiment

Figure 5:
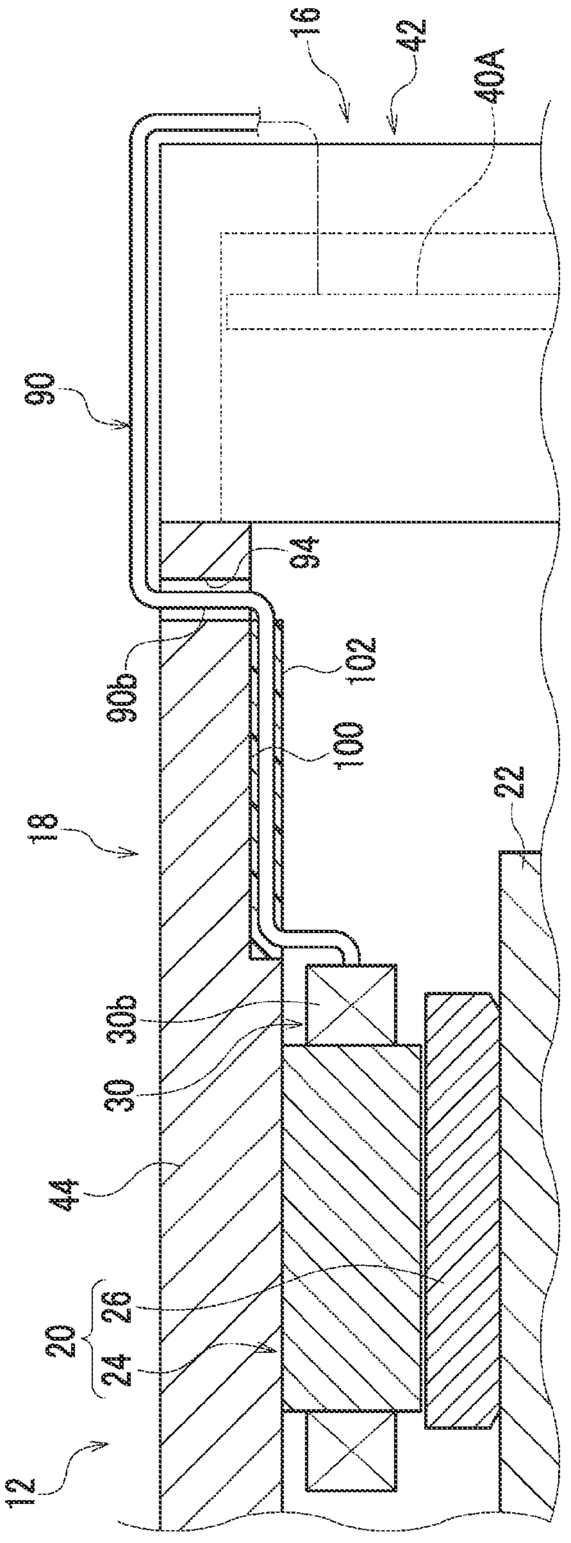
FIG. 5 is a side cross-sectional view showing a second mold member of further embodiment.

FIG. 5 will be referred to. An actuator 10 of further embodiment will be described. In the present embodiment, other features relating to the wiring 90 used in another embodiment will be described. The features of the present embodiment may be used in combination with the first mold member 96 of another embodiment, or may be used alone without being combined with the first mold member 96.

The actuator 10 includes a wiring groove 100 provided in the housing 18. The wiring groove 100 of the present embodiment is provided on an inner surface portion (inner peripheral portion) of the housing 18 as an example, but may be provided on an outer surface portion (outer peripheral portion) thereof. The wiring groove 100 is provided to be recessed with respect to a surface portion of the housing 18. The surface portion here is a concept including both the inner surface portion and the outer surface portion of the housing 18. The wiring groove 100 is provided to extend in the axial direction. The wiring 90 drawn from the motor coil 30 is disposed in the wiring groove 100 to follow the wiring groove 100. Here, a case where one wiring 90 is disposed in one wiring groove 100 is assumed. In addition, a plurality of wirings 90 may be collectively disposed in the same wiring groove 100, or corresponding wirings 90 may be disposed in individual wiring grooves 100 corresponding to the individual wirings 90, respectively.

The actuator 10 includes a second mold member 102 that fixes the wiring 90 inside the wiring groove 100. The second mold member 102 is provided to fill the wiring groove 100 while covering the wiring 90 in the wiring groove 100. The second mold member 102 is a mold resin formed of a resin material having insulation properties. The second mold member 102 is formed by molding or the like and is integrated with the housing 18. In a case where the second mold member 102 is molded, in the present embodiment, the stator 24 is disposed at a planned disposition position of the stator 24 in the housing 18, thereafter the wiring 90 drawn from the motor coil 30 is disposed in the wiring groove 100, and then the second mold member 102 is molded.

Accordingly, the second mold member 102 can restrain the free movement of the wiring 90 disposed in the wiring groove 100. Therefore, as compared to a case where the wiring 90 is not fixed by the second mold member 102, it is advantageous in avoiding interference between the wiring 90 and a peripheral structure due to a large movement of the wiring 90. The peripheral structure here refers to, for example, a movable component such as the motor shaft 22 inside the housing 18 in a case where a part of the wiring 90 is fixed in the housing 18, and refers to an external structure located in the periphery of the housing 18 in a case where a part of the wiring 90 is fixed outside the housing 18. In particular, it is advantageous in that interference with the peripheral structure can be avoided without using an inhibiting member such as a plate that inhibits the approach to the peripheral structure such as a movable component.

Next, modifications of the components described so far will be described.

Heretofore, the input shaft 32 and the motor shaft 22 have been described as examples of the first inner shaft 70A and the first outer shaft 72A that are connected to each other, and the center pipe 50 and the attachment shaft 52 have been described as examples of the second inner shaft 70B and the second outer shaft 72B that are connected to each other. Specific examples of the inner shaft and the outer shaft connected to each other are not limited to the contents of the embodiments. For example, the inner shaft may be the motor shaft 22 (drive shaft), and the outer shaft may be the attachment shaft 52 connected to the counter-load side of the motor shaft 22. In addition, the inner shaft may be any of the motor shaft 22 (drive shaft) and the center pipe 50, and the outer shaft may be any shaft other than the attachment shaft 52. In addition, it is sufficient that only one of the combination of the first inner shaft 70A and the first outer shaft 72A and the combination of the second inner shaft 70B and the second outer shaft 72B is present, and the other is not essential. For example, the second inner shaft 70B (center pipe 50) and the second outer shaft 72B (attachment shaft 52) may not be provided. In addition, in a case where the second inner shaft 70B and the second outer shaft 72B are provided, the motor shaft 22 (drive shaft) and the input shaft 32 may be integrally formed instead of being separately formed. In addition, only one of the combination of the first inner shaft 70A and the first outer shaft 72A and the combination of the second inner shaft 70B and the second outer shaft 72B may be connected in the fitting portions 74A and 74B, and the other may be connected by a flange connection, a coupling, or the like.

The outer shafts 72A and 72B may be positioned in the axial direction with respect to the inner shafts 70A and 70B by coming into contact with locations other than the axial end surfaces 70*a* of the inner shafts 70A and 70B (for example, the outer step portions provided on the outer peripheral portions of the inner shafts 70A and 70B). The specific examples of the outer members 76A and 76B are not limited to the contents of the embodiments.

The outer shaft that penetrates the driver unit 16 is not limited to the attachment shaft 52 to which the detection target 54*b* of the rotation detector 54 is attached. Similarly, the outer shaft supported by the bearing 84 is also not limited to the attachment shaft 52. For example, the outer shaft may be connected to the center pipe 50 without the detection target 54*b* being attached.

In addition to a case where the motor coil 30 is a part of the stator 24, the motor coil 30 may be a rotor coil wound around a rotor main body (rotor core or the like) of the rotor 26. The driver unit 16 may not include the rotation detection board 40B.

The above-described embodiments and modifications are illustrative. The technical idea that abstracts the embodiments and modifications should not be construed as being limited to the contents of the embodiment and the modifications. Many design changes such as changes, additions, and deletions of components are possible for the contents of the embodiments and the modifications. In the above-described embodiments, the contents for which the design changes are possible are emphasized with the expression of "embodiment". However, the design changes are allowed also for the contents without such expression. The hatching attached to the cross section of the drawing does not limit a material of an object to which the hatching is attached. A component formed of a single member in the embodiments may be formed of a plurality of members. Likewise, a component formed of a plurality of members in the embodiments may be formed of a single member.

It should be understood that the invention is not limited to the above-described embodiment, but may be modified into various forms on the basis of the spirit of the invention. Additionally, the modifications are included in the scope of the invention.

What is claimed is:

1. An actuator including a hollow portion penetrating the actuator in an axial direction, the actuator comprising:
- a motor;
- a speed reducer located on a load side with respect to the motor in the axial direction and configured to reduce rotation output from the motor and output the reduced rotation;
- a first shaft that surrounds the hollow portion; and
- a second shaft that surrounds the hollow portion and is connected to the first shaft to be rotatable integrally therewith,
- wherein the motor includes a stator and a rotor configured to generate a rotating magnetic field in cooperation with the stator,
- the stator includes a stator main body and a motor coil wound around the stator main body,
- the first shaft and the second shaft include a fitting portion in which the first shaft is fitted to an inner periphery of the second shaft, and are connected to each other in the fitting portion,
- a side on which the speed reducer is located with respect to the motor in the axial direction is referred to as the load side and a side opposite to the load side in the axial direction is referred to as a counter-load side, and
- the fitting portion includes a position overlapping a counter-load side coil end portion of the motor coil in a radial direction.

2. The actuator according to claim 1, further comprising:
- a housing;
- an outer member that is located in the housing at a position separated to a radially outer side from the second shaft; and
- a fastening member that fastens the first shaft and the second shaft in the radial direction,
- wherein the fastening member is disposed at a position overlapping the outer member in the radial direction.

3. The actuator according to claim 2,
- wherein the second shaft includes a large outer diameter portion at an axial position of an axial end portion of the first shaft on the counter-load side, and
- the fastening member is screwed into an insertion hole provided in the large outer diameter portion of the second shaft, thereby fastening the first shaft and the second shaft in the radial direction.

4. The actuator according to claim 3,
- wherein the second shaft does not include, on the counter-load side with respect to the large outer diameter portion, a portion having a diameter larger than a diameter of the large outer diameter portion.

5. The actuator according to claim 1,
- wherein the second shaft includes an inner step portion provided on an inner peripheral portion thereof, and the inner step portion comes into contact with an axial end surface of the first shaft so that the second shaft is positioned in the axial direction with respect to the first shaft.

6. The actuator according to claim 5, wherein the inner step portion is formed such that an inner diameter of the second shaft decreases toward an insertion direction in which the first shaft moves toward the counter-load side in the axial direction.

7. The actuator according to claim 5, wherein the second shaft includes an inner diameter portion provided on the inner step portion in an insertion direction with respect to the fitting portion, and the inner diameter portion is formed to have a smaller inner diameter than a location where the fitting portion is formed in the second shaft.

8. The actuator according to claim 1, wherein the first shaft is an input shaft of the speed reducer, the second shaft is a motor shaft, and the input shaft and the motor shaft are connected to each other at the position overlapping the counter-load-side coil end portion of the motor coil in the radial direction.

9. The actuator according to claim 1, further comprising:

a driver unit through which the second shaft penetrates in the axial direction, wherein the first shaft and the second shaft are connected to each other at a position accessible through a cutout portion formed in the driver unit.

10. The actuator according to claim 9, further comprising:

a rotation detector including a detection unit provided in the driver unit and a detection target provided at a position facing the detection unit, wherein the first shaft is a center pipe connected to an output member of the speed reducer, and the second shaft is an attachment shaft to which the detection target is attached.

11. The actuator according to claim 1, further comprising:

a driver unit through which the second shaft penetrates in the axial direction; and a bearing that supports the second shaft on the counter-load side with respect to the driver unit.

12. The actuator according to claim 11, wherein the bearing is supported by a bearing support member, and the bearing support member is disposed on the counter-load side with respect to the driver unit.

13. The actuator according to claim 12, wherein the bearing support member is fixed to a driver casing of the driver unit via a fixing tool.

14. The actuator according to claim 13, wherein the bearing support member is disposed to interpose the driver casing between the bearing support member and the driver unit.

15. The actuator according to claim 1, further comprising:

a wiring drawn from the motor coil; and a first mold member that covers a base end portion of the wiring on a motor coil side and fixes a drawing direction of the wiring from the motor coil.

16. The actuator according to claim 1, further comprising:

a wiring drawn from the motor coil;

a wiring groove provided in a housing; and a second mold member that fixes the wiring in the wiring groove.

17. An actuator including a hollow portion penetrating the actuator in an axial direction, the actuator comprising:

a first shaft that surrounds the hollow portion;

a second shaft that surrounds the hollow portion and is connected to the first shaft to be rotatable integrally therewith; and a driver unit through which the second shaft penetrates in the axial direction, wherein the first shaft and the second shaft include a fitting portion in which the first shaft is fitted to an inner periphery of the second shaft, and are connected to each other in the fitting portion, and the first shaft and the second shaft are connected to each other at a position accessible through a cutout portion formed in the driver unit.

* * * * *